US008099521B2

(12) United States Patent
Reed

(10) Patent No.: US 8,099,521 B2
(45) Date of Patent: Jan. 17, 2012

(54) NETWORK INTERFACE CARD FOR USE IN PARALLEL COMPUTING SYSTEMS

(75) Inventor: Coke S. Reed, Austin, TX (US)

(73) Assignee: Interactic Holdings Inc., Austin, TX (US)

( * ) Notice: Subject to any disclaimer, the term of this patent is extended or adjusted under 35 U.S.C. 154(b) by 1087 days.

(21) Appl. No.: 11/925,546

(22) Filed: Oct. 26, 2007

(65) Prior Publication Data
US 2008/0104369 A1    May 1, 2008

Related U.S. Application Data

(60) Provisional application No. 60/863,114, filed on Oct. 26, 2006.

(51) Int. Cl.
*G06F 15/16* (2006.01)
*G06F 13/00* (2006.01)

(52) U.S. Cl. ........................................ 709/250; 711/130

(58) Field of Classification Search .................. 709/250; 711/118, 130
See application file for complete search history.

(56) References Cited

U.S. PATENT DOCUMENTS

| | | | | |
|---|---|---|---|---|
| 5,613,071 A * | 3/1997 | Rankin et al. | .......................... | 1/1 |
| 5,710,932 A * | 1/1998 | Hamanaka et al. | ............. | 712/14 |
| 5,742,843 A * | 4/1998 | Koyanagi et al. | ................ | 712/14 |
| 6,092,155 A * | 7/2000 | Olnowich | ....................... | 711/142 |
| 7,783,037 B1 * | 8/2010 | Bong | ............................... | 380/37 |
| 7,788,650 B2 * | 8/2010 | Johnson et al. | ................ | 717/140 |
| 2002/0095554 A1 * | 7/2002 | McCrory et al. | ............... | 711/144 |
| 2004/0172485 A1 * | 9/2004 | Naghshineh et al. | ......... | 709/250 |
| 2005/0289298 A1 * | 12/2005 | Savell et al. | ................... | 711/122 |
| 2007/0073976 A1 * | 3/2007 | Chitlur et al. | .................. | 711/135 |

OTHER PUBLICATIONS

Culler et al., Parallel Computing on the Berkeley NOW, 1997, (9th Joint Symposium on Parallel Processing ), Kobe, Japan http://citeseerx.ist.psu.edu/viewdoc/summary?doi=10.1.1.98.2173.*

* cited by examiner

*Primary Examiner* — Joseph Avellino
*Assistant Examiner* — James Conaway
(74) *Attorney, Agent, or Firm* — Koestner Patent Law; Ken J. Koestner

(57) ABSTRACT

A network device comprises a controller that manages data flow through a network interconnecting a plurality of processors. The processors of the processor plurality comprise a local memory divided into a private local memory and a public local memory, a local cache, and working registers. The network device further comprises a plurality of cache mirror registers coupled to the controller that receive data to be forwarded to the processor plurality. The controller is responsive to a request to receive data by transferring requested data directly to public memory without interrupting the processor, and by transferring requested data via at least one cache mirror register for a transfer to processor local cache, and to processor working registers.

12 Claims, 11 Drawing Sheets

NETWORK INTERFACE CARD FOR USE IN PARALLEL COMPUTING SYSTEMS

RELATED PATENT AND PATENT APPLICATIONS

The disclosed system and operating method are related to subject matter disclosed in the following patents and patent applications that are incorporated by reference herein in their entirety:

1. U.S. Pat. No. 5,996,020 entitled, "A Multiple Level Minimum Logic Network", naming Coke S. Reed as inventor;
2. U.S. Pat. No. 6,289,021 entitled, "A Scaleable Low Latency Switch for Usage in an Interconnect Structure", naming John Hesse as inventor;
3. U.S. application Ser. No. 10/887,762 filed Jul. 9, 2004 entitled "Self-Regulating Interconnect Structure"; naming Coke Reed as inventor; and
4. U.S. application Ser. No. 10/976,132 entitled, "Highly Parallel Switching Systems Utilizing Error Correction", naming Coke S. Reed and David Murphy as inventors.

BACKGROUND

Nodes of parallel computing systems are connected by an interconnect subsystem comprising a network and network interface components. In case the parallel processing elements are located in nodes (in some cases referred to as computing blades) the blades contain a network interface card (in some cases the interface is not on a separate card). An operating system is chosen in part based on the characteristics of the network. Network interface cards (NICs) are designed to attain the best possible performance given the characteristics of the processors, the processor interface protocol, the network, and the operating system.

SUMMARY

In accordance with an embodiment of a network device, a controller manages data flow through a network interconnecting a plurality of processors. The processors of the processor plurality comprise a local memory divided into a private local memory and a public local memory, a local cache, and working registers. The network device further comprises a plurality of cache mirror registers coupled to the controller that receive data to be forwarded to the processor plurality. The controller is responsive to a request to receive data by transferring requested data directly to public memory without interrupting the processor, and by transferring requested data via at least one cache mirror register for a transfer to processor local cache, and to processor working registers.

BRIEF DESCRIPTION OF THE DRAWINGS

Embodiments of the illustrative systems and associated techniques relating to both structure and method of operation may be best understood by referring to the following description and accompanying drawings.

DETAILED DESCRIPTION

Figure 1A:
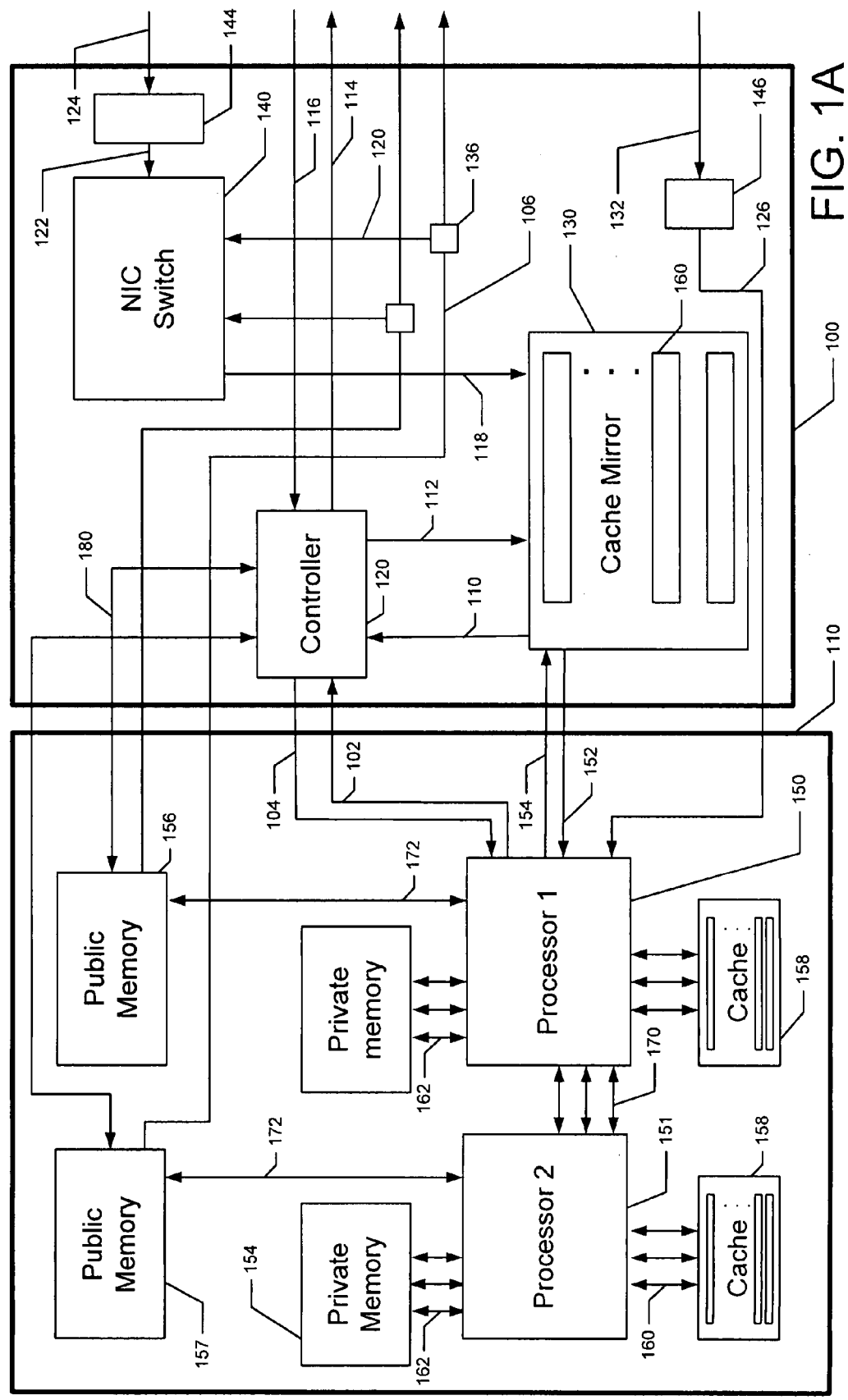
FIG. 1A is a schematic block diagram illustrating a plurality of network interface cards (NIC) connected to a processing node.

Present operating systems for cluster computers are designed based on the characteristics of available networks that have large latency and cannot efficiently carry short packets. Given that the shortcomings are removed by the Data Vortex® network, a new operating system designed around short packets can be used. The improvements enabled by the Data Vortex® network and new operating system are facilitated by a new type of network interface card to optimize performance. The disclosure herein describes a novel network interface card suitable for use in the improved systems. A feature of some embodiments of the NIC described herein is that short packets are placed in registers by a Data Vortex® on the NIC. The registers are useful in gathering data from across the system and preparing the data to be used by the processors. The registers mirror a portion of the cache in a processor. In one embodiment, each register contains multiple data entries. In some embodiments the registers, for example referred to as a cache mirror register (CMR) or as a gather-scatter register, each contain a cache line of data so that a portion of cache is "mirrored" on the NIC.

In some embodiments, a Network Interface Card (NIC) includes a controller, which can be referred to as a scheduler, that works with the processors to manage the flow of data through the system. Another NIC component is a collection of cache mirror registers (CMR) that receive data to be forwarded to the processors. A processor requesting to receive data to local memory processor memory (divided into private local memory and public local memory) sends a request to the controller to handle the transfer. In case the transfer is to public memory the NIC handles the transfer without interrupting the processor. In case the transfer is to: 1) a processor's cache; 2) a processor's working registers; or 3) public memory that is managed by the processor; the receiving controller selects a register or a collection of registers as well as a location or a collection of locations in the registers to be the recipient or recipients of the data and informs the receiving memory manager of the identity of the register. In one embodiment, the register identity is also transmitted to the sending controller. The sending controller places the identity of the receiving node and the receiving register on the appropriate node in the data packet header. The message including one or more packets is sent to the proper CMR. A register may contain packets from a single source or from multiple sources. Often a register contains a cache line to be delivered to a node processor. The placing of packets from different sources in the same register is an efficient manner of gathering data. In some but not all cases, a processor directing a packet to a remote node sends a packet to the target node controller that instructs the remote node to request the data by scheduling the transfer. The illustrative disclosure describes the physical interconnect of the components and also describes the flow of data between the devices.

The efficient loading of the CMRs is handled by a switch that can handle short packets. The Data Vortex® is a highly suitable switch to handle the task.

A parallel processing system comprises multiple nodes interconnected by a network. The illustrative disclosure describes a means and method of interfacing the processing nodes to the network system. For a useful class of applications, a given processor in the system is idle most of the time, an undesirable condition at least partly caused by the amount of time expended for a message packet to travel from one processing node to another. Travel time is referred to as latency. A first factor contributing to latency is the amount of time that the packet spends in the network. The time is greatly reduced by using the network systems described in the incorporated patents and patent applications. Another portion of the time is due to the hardware and software overhead in the interface between the network and the computing nodes. Interface latency is greatly reduced in the present system. The illustrative structures and systems also have the advantage that processor interrupts are reduced to a minimum. Another advantage of the illustrative structures and systems is the efficient handling of gather and scatter operations.

The system comprises multiple computing nodes each with a NIC connected by a network with the network utilizing a plurality of switch chips. In an illustrative embodiment, each NIC contains one or more Data Vortex® switch chips and the network contains one or more Data Vortex® switch chips.

Referring to FIG. 1A, a schematic block diagram illustrates a first system embodiment comprising a computing node 110 and a NIC 100. The computing node contains one or more microprocessors and associated memory. Additionally, the node may contain a disk drive and possibly other hardware. The illustrative design has two processing chips. Other designs can have different numbers of chips. The illustrative processors have an associated off-chip cache. In other designs, all of the processor cache can be on the processor chip. In the illustrative design of FIG. 1A, all of the communication between the processors and the NIC is carried out by Processor 1 150. In other designs, the NIC is able to communicate directly with Processor 1 and Processor 2. The NIC accesses the processor 1 public memory 156 through processor 1. The communication from the processor to the NIC is described in the illustrative disclosure as sending a message packet to the NIC. In fact, the processor views the operation as making a store into memory mapped I/O (MMIO). In many instances the term sending a packet may in fact have a different interpretation depending on the context.

The NIC 100 contains three main components: 1) the NIC switch 140; 2) the controller 120 and registers 130 to hold data being sent to the processing node 110. The operation of the three components is described by examples that trace message packets through the system.

Example one treats the case wherein processor 2 152 requests data from a remote node. Processor 2 sends a request through processor 1 to the controller 120 illustrated in FIG. 2 by processor 2 writing the request to a request memory buffer 220 in a memory buffer stack 230 located in the controller logic unit 250 of the NIC controller 102. The controller contains a stack of request buffers that contain the requests. One method of preventing the request buffers from overflowing is to allow only a limited number of outstanding requests at a given time. The request contains the identity of the node containing target data and also contains the physical or virtual address of the location to store the data. Five cases are considered.

Figure 2:
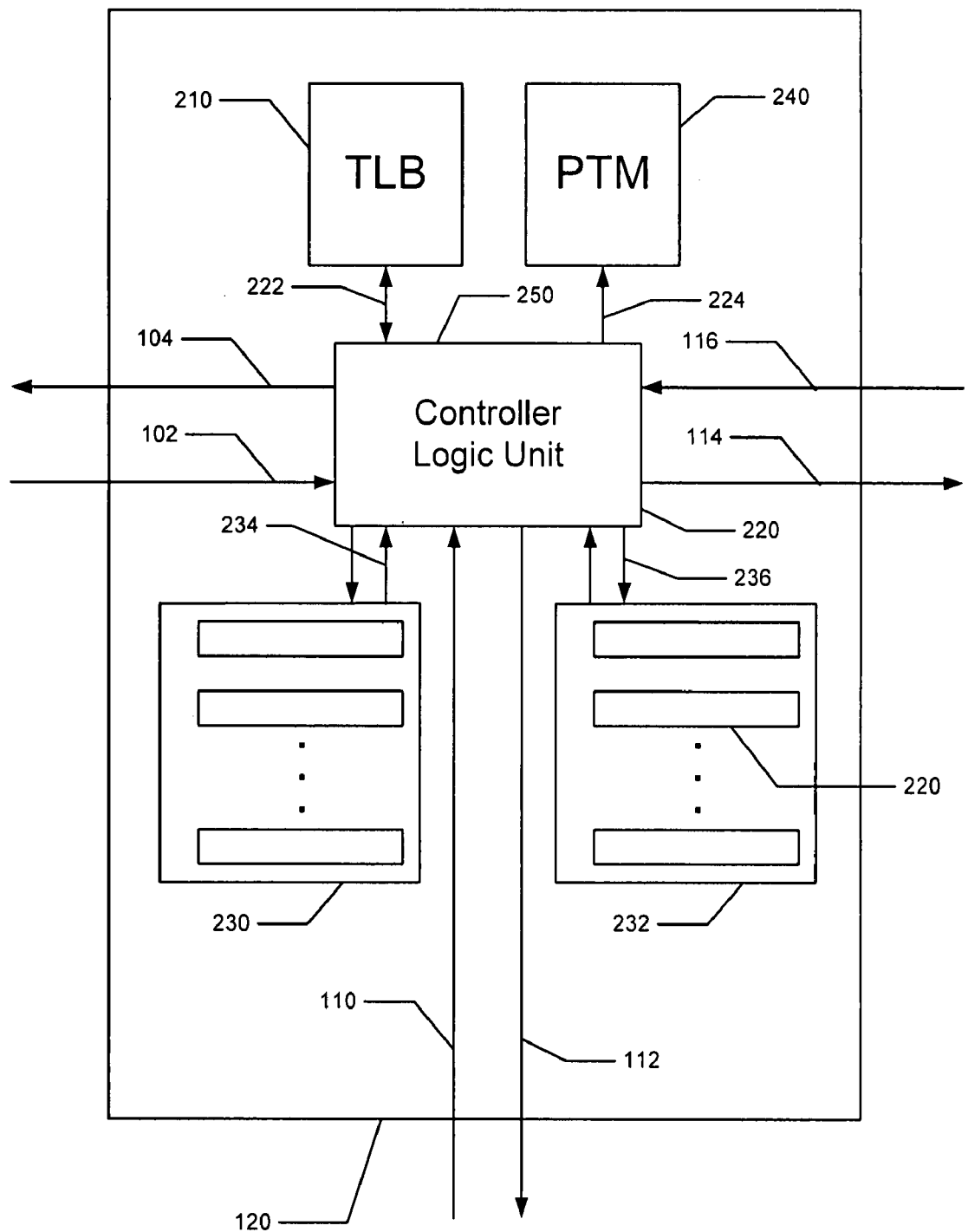
FIG. 2 is a block diagram illustrating the NIC controller.
Figure 3:
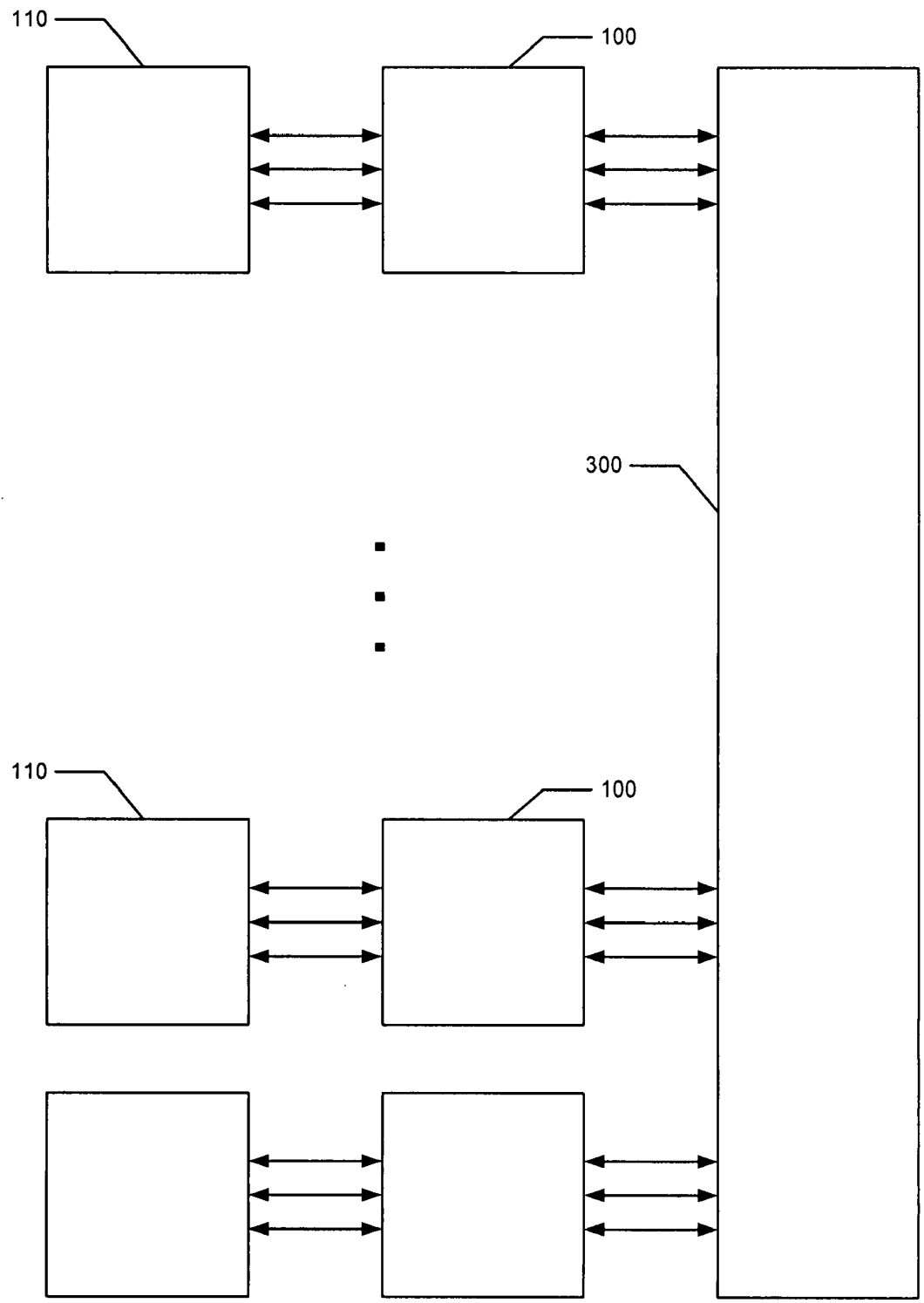
FIG. 3 is a block diagram of a system comprising processing nodes (blades) connected by a central switch.

Case I: The processor $P_R$ 150 or 152 on compute node requests data to be transferred from the public memory of a remote to a location in the public memory space of the processor $P_R$. In a more interesting case than the current example, the processor gives the virtual address of the storage location. The request is made by sending a request packet to the controller 120. In case processor $P_R$ is processor 2 152, the request travels through processor 1 150. The request packet travels on lines 170 and 102. The request packet contains the following fields: a field indicating a request number (a location in buffer 230 indicated in FIG. 2); a field indicating that the request is for data in local public memory of a remote node; a field containing the amount of data to be transferred; a field identifying the virtual address of the data to be transferred (with the virtual address indicating that the data is on a remote node); and the virtual address of the location where data is stored on the memory accessed by processor $P_R$. The controller 120 has tables that contain the label of the node where the data with the virtual address is stored. Referring to FIG. 2, the controller logic unit 250 places the request in the storage location in a buffer 230 indicated by the message number. The buffer 230 never overflows because a processor can have only a limited number of outstanding requests. In one embodiment, requests are serviced in the order received. In another embodiment, requests are serviced partially based on quality of service criterion. The request remains in the request buffer 230 until the data has been successfully delivered to the proper location. The controller logic unit accesses a request from the buffer 230 and looks up the physical location of the compute that stores the data to be transferred, for example by accessing the physical page table map (PTM) 240 that stores the physical location of compute nodes (in some cases based on the leading bits of the virtual address of the memory to be accessed). The control logic unit then sends the request for data to the NIC associated with the compute node storing the data to be accessed (with the data associated with a sending processor $P_S$). The request packet contains a field indicating a request packet number that is the physical location of the request in the buffer 230. The request passes through a switching system to the target NIC. FIG. 3 illustrates the blades 110 connected to NICs 100 and connected to a switching system 300. In an illustrative embodiment, the switching system 300 is a Data Vortex® of the type described in the incorporated patents and applications.

While the request is in transit to the remote node, the control logic accesses a TLB 210 that holds the physical location of the virtual memory reference where the arriving packet or packets will be stored. The location is determined and appended in an additional field to the request packet in buffer 230. An aspect of the present design is that the accessing of the physical location in the TLB is done concurrently with the sending of the request packet so that the lookup does not add latency to the process. The amount of memory on the NIC is reduced by the fact that the TLB 210 only holds physical addresses of local memory and by the fact that the PTM 240 only holds blade addresses and not addresses of memory on those blades. Known techniques can be used to design the TLB and PTM to perform hashing techniques and include special locations for storing recently accessed addresses. The technique used in the storing of members of sequences based on an offset from the first member of the sequence is a feature of languages such as C and can be used to advantage in reducing the size of the TLB.

The request arrives at the remote node (the data sending node) and enters the control logic unit 250 of the controller 120. The controller logic unit places the request in buffer 232. Multiple various techniques can be employed to keep buffer 232 from overflowing. In one embodiment, the buffer 232 has a capacity of the number of requests of N times the number of processing nodes (blades) in the system. The system is constrained by a rule that no node can request more than N data packets from an individual remote node. In one embodiment, the buffer 232 is divided into N sections with one section reserved for each blade. In another embodiment, the sending controller requests permission to send a request. In yet another embodiment, no buffer regulation is performed and a request to a controller with a full buffer 232 is rejected and an ACK is returned. Other techniques can be employed including usage of tokens to assure that the buffer 232 does not overflow. For very large systems, the buffer 232 is divided into N sections with one section reserved for a group of blades (for example all of the blades in a cabinet).

The controller logic unit services a request from buffer 232 by accessing the TLB to find the data in the local public memory space of the controller logic unit. The requested data is then returned to the requesting controller unit with the address of the packet request in unit 230 contained in the header. The controller logic unit obtains the physical address from buffer 230 and sends the data to the proper physical address in the local public memory space.

In one embodiment wherein the data transfer associated with the data request comprises multiple packets, the number of packets requested is indicated in the request packet stored in unit 230. As each of the packets arrives the Controller Logic Unit maintains running total of the number of arriving packets associated with the given request. Thus the Controller Logic has notification when the transfer is complete. When complete, the controller sends an acknowledge (ACK) to the processors $P_R$ and $P_S$. In response to the ACK, Processor $P_R$ frees the request packet number to be used in another request.

The controller also sends an ACK packet to the data requesting processor indicating that the data is in place. In response to the ACK, the processor decrements a counter that keeps track of the number of outstanding requests for data. After the successful transfer of the data (in some embodiments denoted by an ACK) the controller logic unit frees the location in buffer 230 for another request. In some embodiments, the packets that are delivered in response to a given request arrive in order. In other embodiments, the packets associated with a given request contain a packet number in their header that enables the packets to be placed in order by the controller. In still other embodiments that use a plurality of switch chips in a central hub, multiple lines 124 deliver data from the central switch hub and the proper placement of the packet in the message depends upon which line the packet arrives. The discussion of Case I assumes that the controller 120 utilizes a memory controller that is capable of placing one or more packets into the local public memory units.

Figure 4:
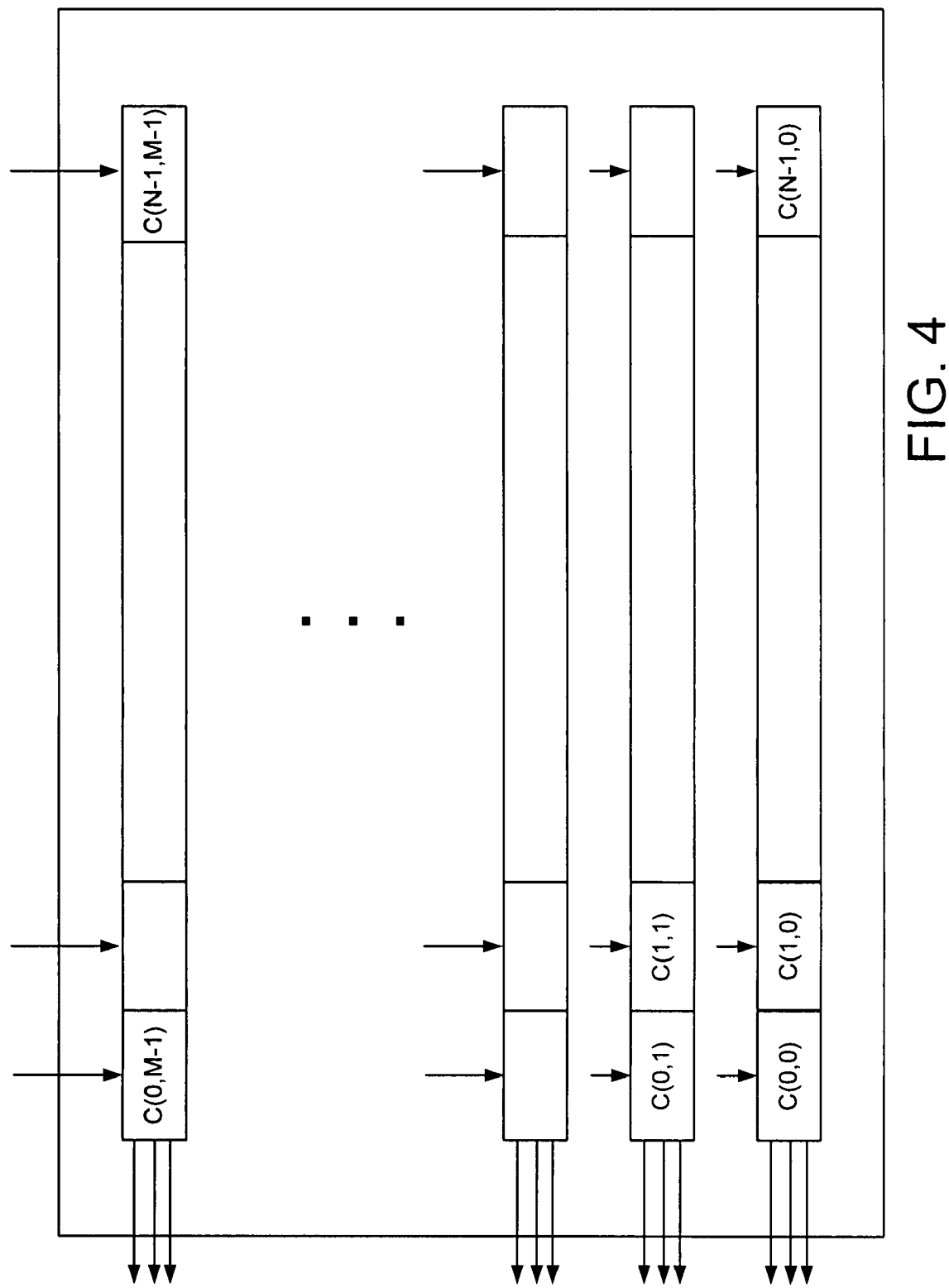
FIG. 4 is a block diagram illustrating the gather portion of the gather-scatter registers.

Case II: A processor $P_R$ requests data in a remote public memory to be stored in a location in the cache or the working registers of the processor $P_R$. The processor requests that the data be stored in a CMR 160 that is located in the memory buffer 130. Each CMR register contains a lock that prohibits data from flowing to the processor until the lock is released. The processor sets aside a location to track which CMR units are free. FIG. 4 illustrates a buffer 130 containing M CMR units with each CMR containing N cells (memory locations). A processor requesting data sends a request to the controller 120 on the associated NIC requesting that a data item at a given virtual address be sent to one or more of the M·N cells in buffer 130. The controller logic unit uses the PTM to ascertain the physical location of the node containing the requested data. The request packet contains the physical address of the receiving node, as well as the address of the cell or cells that will receive the data. The request packet also contains the virtual address of the requested data. The request packet travels through system switch 300 to the node containing the data. As in Case I, the receiving logic unit places the request in a buffer (not illustrated) to hold the request until the request can be serviced. When the remote data containing node services the request, the node accesses local TLB to find the physical address of the data. The data containing packet travels on line 124 to the buffer 144 on the NIC associated with processor $P_R$. The method of preventing overflow of the buffer 144 is handled in the same way as the overflow management of buffer 232. The data packets arriving at the NIC Switch are sent to the proper CMR cell through data lines 118.

FIG. 4 illustrates a buffer 130 containing M CMRs with each CMR 160 containing N data cells 402. In an example where the NIC switch has 512 output ports, and the number of cells in each CMR is 8, and N is equal to 64, then each cell can be connected to a unique output port of the NIC switch. In case the NIC switch 140 is a Data Vortex® switch, and each of the ports runs at 2 Gb/sec, then the maximum bandwidth into the CMRs exceeds a Terabit/sec. A processor can also request data from local public memory to be sent to a CMR on the processor NIC. The data travels through data line 106 and is switched to line 120 to the NIC Switch by switch 130.

Figure 5:
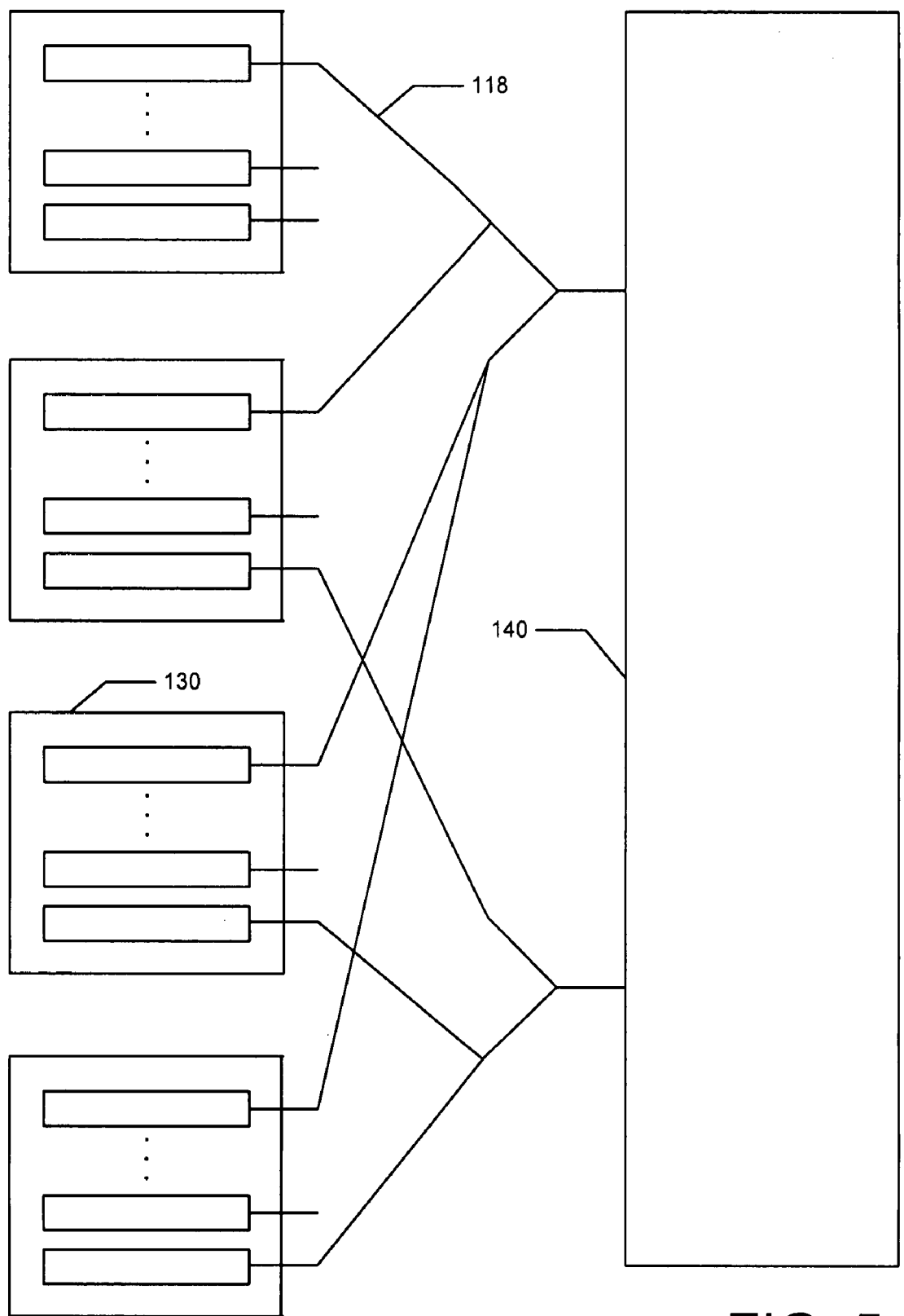
FIG. 5 is a diagram depicting a tree interconnection for carrying data from the NIC switch to the gather portion of the gather-scatter registers.

The total number of CMR cells can exceed the number of output ports of the NIC switch. In one embodiment that enables a large number of CMR cells, the CMRs are divided into banks with each bank having the number of cells equal to the number of output ports in the NIC switch. The high order bits in the data header allow the data to branch through a tree between the NIC switch and the banks of CMRs. Such a configuration with four banks of CMRs is illustrated in FIG. 5. Only a portion of the lines carrying data packets from the NIC Switch to the CMR cells are illustrated.

In one embodiment, a processor can make a single request to store multiple data items in associated CMRs. For example, a processor can request a sequence of data items to be stored contiguously in a remote memory location for placement in a row of cells in the processor CMR buffer or can request that the sequence be stored in a column of cells in the CMR. Each of the packets associated with a given request contain the request number as well as the address of the cell in the CMR. Storing of different sequences in columns allows the processor to simultaneously access multiple streams of data in a powerful and useful computing paradigm that is enabled by the illustrative structures and systems. When all of the packets associated with a given request are received by the NIC associated with processor $P_R$, and ACK is returned to processor $P_S$.

When data is transferred to a CMR, a technique is employed for determining when a given CMR line is full and ready to be transferred to the processor. One method for tracking CMR line information is managed by a special set of M registers (not pictured) in the Controller Logic Unit. The registers are referred to herein as the CMR Full Status Registers. Before a processor $P_R$ issues a plurality of requests to place data in GSR row K, the processor $P_R$ ascertains which cells in row K are to receive the data. Processor $P_R$ sends a special packet to the Controller Logic Unit indicating the information. In the case where a processor sends a request that places data in a subset S of the CMR registers, all of the Full Status Registers associated with the request are updated. As data packets arrive back to the NIC associated with processor $P_R$, the data in the Full Status Registers is modified. When a packet destined for row K arrives, the value in the Full Status Register K is decremented. When the contents of Full Status Register is decremented to zero, then all of the data destined for CMR row K has arrived and the Controller Logic Unit releases a lock that otherwise prohibits data to flow from row K into cache associated with $P_R$ or into the working registers of $P_R$. In some embodiments, after a set amount of time, data is transferred from a CMR register before the lock is released and an indication is made that the data in the CMR register is not valid. One method of determining whether the data in the CMR is valid is by prohibiting the sending of data to the leftmost location in the register. When all of the other data items have arrived, a code word is placed in the leftmost location indicating that all of the data has arrived. In case the data is sent because of a timeout and not because the lock is released, the code word will not be placed in the location and the processor will be able to tell that the data is invalid.

Case III: A processor P sends a short message to a remote processor by having additional CMRs (not illustrated) that can be written to by remote processors and read by local processors. The method of preventing overflow of the buffer is handled in the same way as the overflow management of buffer 232. The sending processor sends the short message to the receiving controller that manages the data in the CMRs that can be read locally and written remotely.

Case IV: A processor P sends a short message to a remote public memory by the processor sending the message packet or packets to the local NIC controller local to the processor and having that controller send the packet to the target controller. A special buffer space in the target controller holds the messages. The method of preventing overflow of the buffer is handled in the same way as the overflow management of buffer 232. The short messages are referred to as atomic memory operations and can be used for controlling the memory in distributed shared memory machines. In the programming language UPC, a small number of the atomic memory operations facilitate overall execution of programs on distributed shared memory machines.

Case V: A processor sends or receives data from a local public memory space, for example by directly accessing the memory through line 172. The operation is done with care to avoid a race condition. A processor can also access local public memory by going through the controller that is connected to local public memory through lines 180. The advantage of having the processor access local public memory through the controller is avoidance of race conditions afforded by having a single access point to the memory.

Figure 1B:
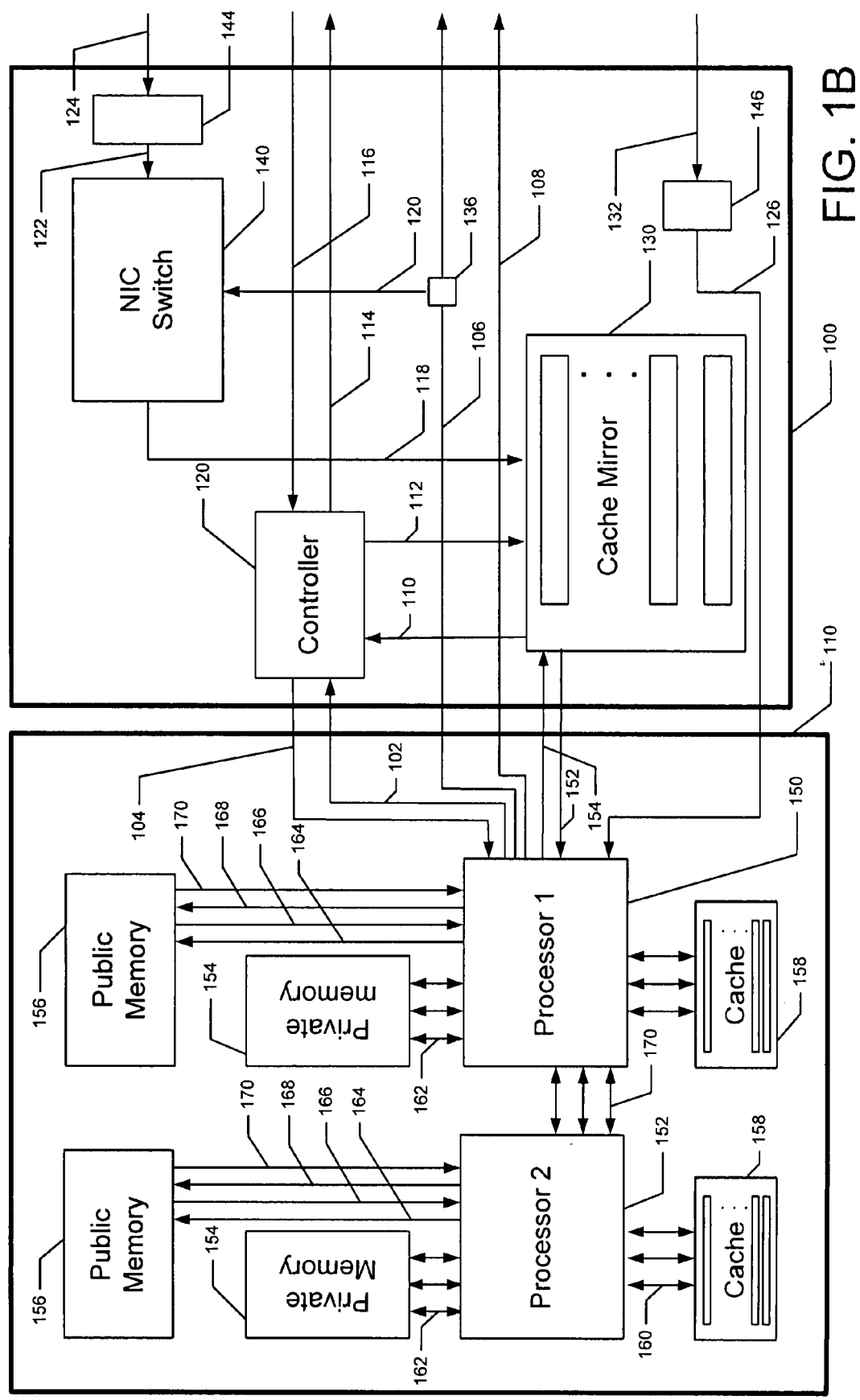
FIG. 1B is a schematic block diagram illustrating multiple network interface cards (NIC) connected to a processing node where data targeted to public memory passes through a processor.

In an embodiment illustrated in FIG. 1B, data can pass from the NIC to the public memory space through the processor. Details of operation are processor dependent. For certain processors (including AMD Opteron processors) the memory controller is located in the processor and the TLB can be omitted in the NIC.

The end-to-end latency of a distributed shared memory system illustrated in FIG. 3 using a Data Vortex® in the central switch 300 and using a network interface as described in the illustrative disclosure using a Data Vortex® for the NIC Switch 140 in FIG. 1A or FIG. 1B is extremely low. The latency can be decreased still further by incorporating all or most of the features of the NIC 100 onto a single chip.

Figure 6:
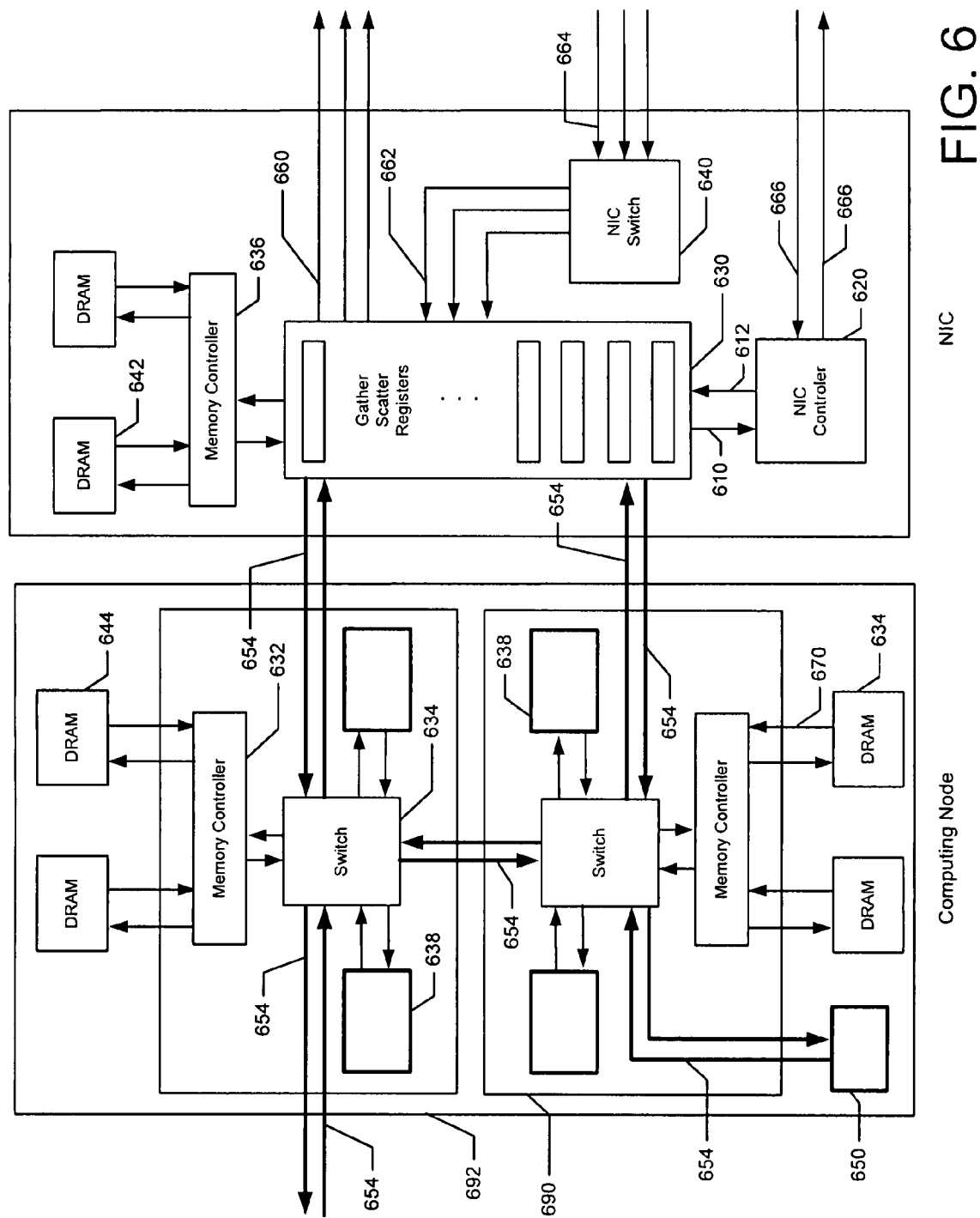
FIG. 6 is a schematic block diagram illustrating another embodiment wherein all data passing between a processor and a NIC passes through a gather-scatter register. Moreover data not connected to a processor's memory controller passes through a gather-scatter register.

In the first embodiment, the registers on the NIC were used to transfer data into the processors. In a second embodiment, the registers are used to transfer data both into and out of the processor. In the first embodiment the NIC registers were referred to as Cache Mirrors. In the second embodiment the NIC registers are referred to as Gather Scatter registers. Referring to FIG. 6, a schematic block diagram illustrates an embodiment that may include two types of memory that are accessed in different ways. A first type of memory 644 is connected to a processor through a memory controller. In the case of the AMD Opteron processor, the memory controller is on the same silicon die as the computing core or cores. The second type of memory 642 is connected to a gather-scatter register by a memory controller. In case a computing language such as UPC is used, each of the two types of memory may be separated into public and private memory regions. The requests for data transfer come from the processors. In FIG. 6, the processor contains multiple units 638 each comprising a processor core and levels of cache.

An example description consistent with AMD Opteron processors will be given for the case where the processor and memory controllers move data in cache lines comprising eight 64-bit words. One skilled in the art will be able to translate the example presented here to be compatible with a wide range of processors and memory controllers which move data of different size blocks. The techniques described herein can be applied to cases where the blocks transferred from DRAM 644 are not equal to the blocks transferred from DRAM 642. The system will be explained by considering two cases.

In the first case, a processing core 638 of a processor 690 on a computing node 692 requests that data be transferred from a sending location to a group of receiving locations (often to eight such locations) in gather-scatter registers of the processor NIC (with the data receiving NIC denoted by RN and the data sending NIC denoted by SN). The purpose of the request is to have the data available to move from the gather-scatter register to a local processing core working register in core 638, cache in core 638, to memory 644, or to memory 642 on RN. In the cases of interest, the sending location is a remote memory 644, a memory 642, or a remote gather-scatter register 630. The processing core issues the request by sending a request packet through line 654 to a location in the SN gather-scatter register 630. The request often asks a specific remote node to deliver eight 64 bit words to eight different locations in the processor's local gather-scatter register on RN. Logic in the scatter register transfers the request packet to the NIC controller in RN. The controller in RN assigns a label to the request and maintains a copy of the request in a memory location set in the controller to the label of the request. In a simple embodiment, the memory location in RN is set to the address of SN, an identifier REQID of the particular request for data from SN. RN then sends the request through the central hub switch to a remote data sending NIC denoted by SN. The SN controller assigns a location to store the request. In a simple embodiment, SN stores the request in address (the address of RN, REQID). A useful aspect of the storing scheme is that RN has information about where the request is stored in SN, a condition that can also be accomplished by having SN assign a storage location and send a special packet to RN informing RN of the storage location. Various indirect lookup schemes can also be implemented.

If the requested data is not already in an SN gather scatter register, then the NIC controller on SN transfers the data to the proper scatter register from memory 634 or 642. The eight 64 bit words are transferred to eight different switch chips in the central hub and then delivered to NIC switch 640 on node RN.

Each of the eight packets contains the requested data, the address of the RN, the request label, the target location in the gather-scatter registers to place the data, and a unique data packet identifier chosen from the integers 0, 1, ... 7) indicating which of the eight requested packets is being sent. Upon successful delivery of a packet, the receiving register sends a local ACK with the data packet identifier to a location in the RN controller that stores the request. A highly efficient method of delivering the ACK to the proper location is by using a Data Vortex® switch (not pictured) on line 612 or in the gather-scatter register hardware. When all eight local ACKs have been received, RN sends a remote ACK through the central hub switch to the NIC controller in SN. The ACK can be sent to the location holding the request by using a Data Vortex® switch in the NIC controller on RN. When the ACK is received, the request packet can be discarded and the location holding the request can be freed for another request packet. In case one of the eight packets associated with the request is not properly received, a NAC will request that the packet be resent. When a full cache line of packets has been received, said cache line can be transferred to the correct location in DRAM 642, DRAM 638, or cache in processing core 638 as prescribed by the request packet. One method of determining if the cache line is full is discussed in the description of the first embodiment. The sending of data due to a timeout is also handled as in the first embodiment.

In a second case, a processor initiates the sending of data to a remote location, for example by SN sending a request to RN asking RN to request the data. The process then proceeds as in the first case.

Figure 7:
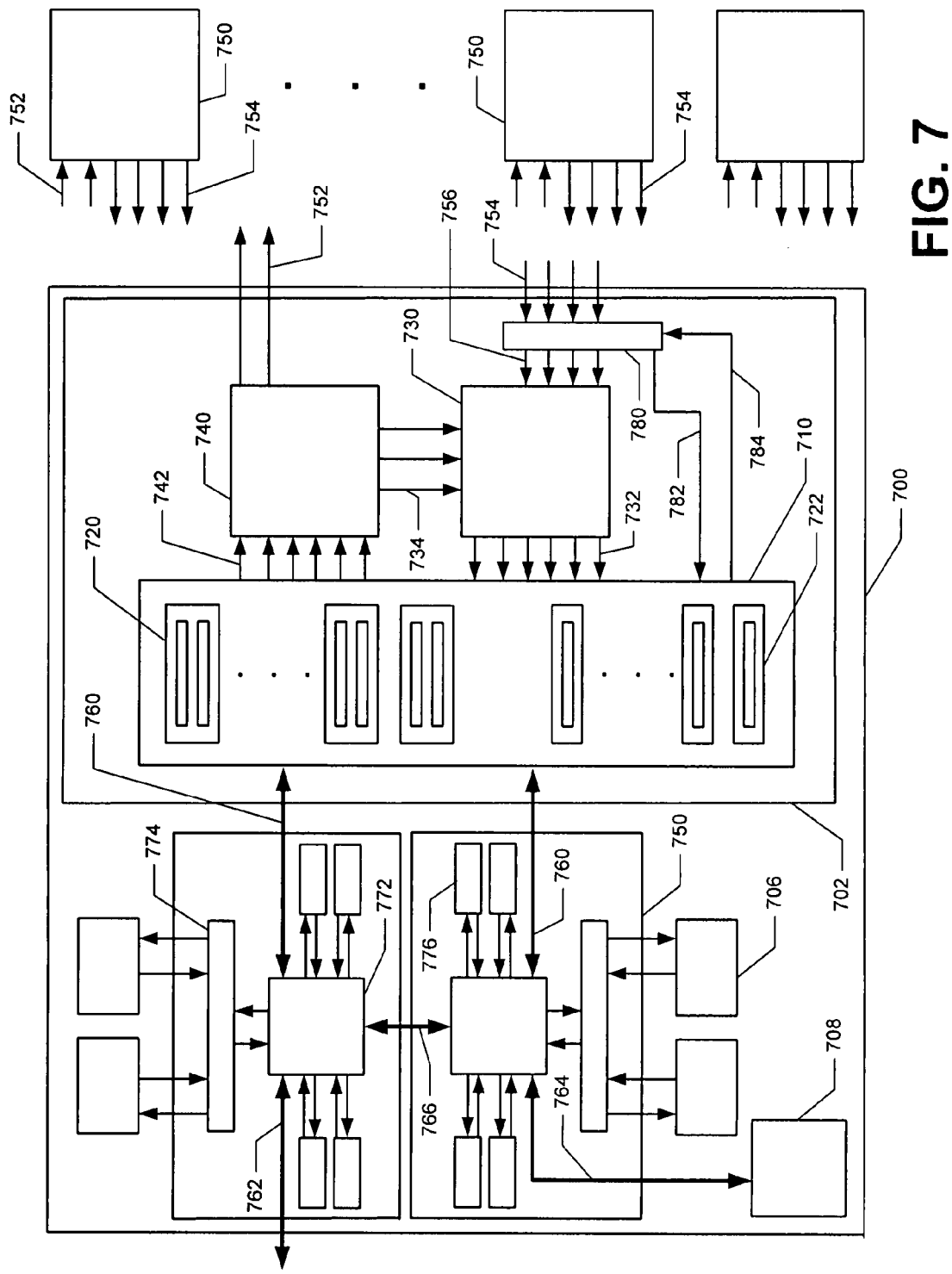
FIG. 7 is a block diagram of a parallel computer employing Data Vortex® switches on the NIC and also Data Vortex® switches in the central switch hub.

Referring to FIG. 7, a schematic block diagram depicts a third embodiment and shows a compute node 700 comprising two processors 750, memory 706, and a NIC chip 702, and also shows central hub switch chips 770. FIG. 7 is an illustrative example showing a specific parallel computing system using AMD Opteron processors and Data Vortex® chips in the central switch hub. The devices and method of operation of the illustrative example can be applied to a very wide class of parallel systems using other processors. A given compute node is connected by lines 752 to each of the central switch hub chips that receive data from the NIC. A compute node is connected by lines 754 to receive data from each of the central switch hubs that send data to the NIC. In many useful "one hop" systems each of the central switch hub chips is connected to receive and send data from and to all of the NICs. For example, a "one hop" system comprising 256 compute nodes and forty Data Vortex® switch chips in the central hub can be configured with 256 NIC output links 752 on a compute node (one to each of the central switch chips) and forty NIC input links 754 (one from each central switch chip).

The NIC contains of a collection 710 of registers including the simple registers 722 and also including the compound Gather-Scatter registers 720. The NIC also contains an output switch 740 and an input switch 730. The illustrative NIC also contains an EC-ACK unit 780 that performs error correction and sends ACKs and NAKs. Data Vortex® switches are highly suitable for usage as the switches. No DRAM or memory controller is included on the NIC. The system memory 706 is accessed through an on-processor memory controller 774. All data that is transferred between compute nodes uses the Gather-Scatter registers. The NIC illustrated in FIG. 7 does not contain a separate NIC controller. The functions of the NIC controller illustrated in FIG. 1A, FIG. 1B, FIG. 2, and FIG. 6 are carried out by the Opteron processors and also by computational hardware integrated into the Gather-Scatter NIC registers.

Figure 8A:
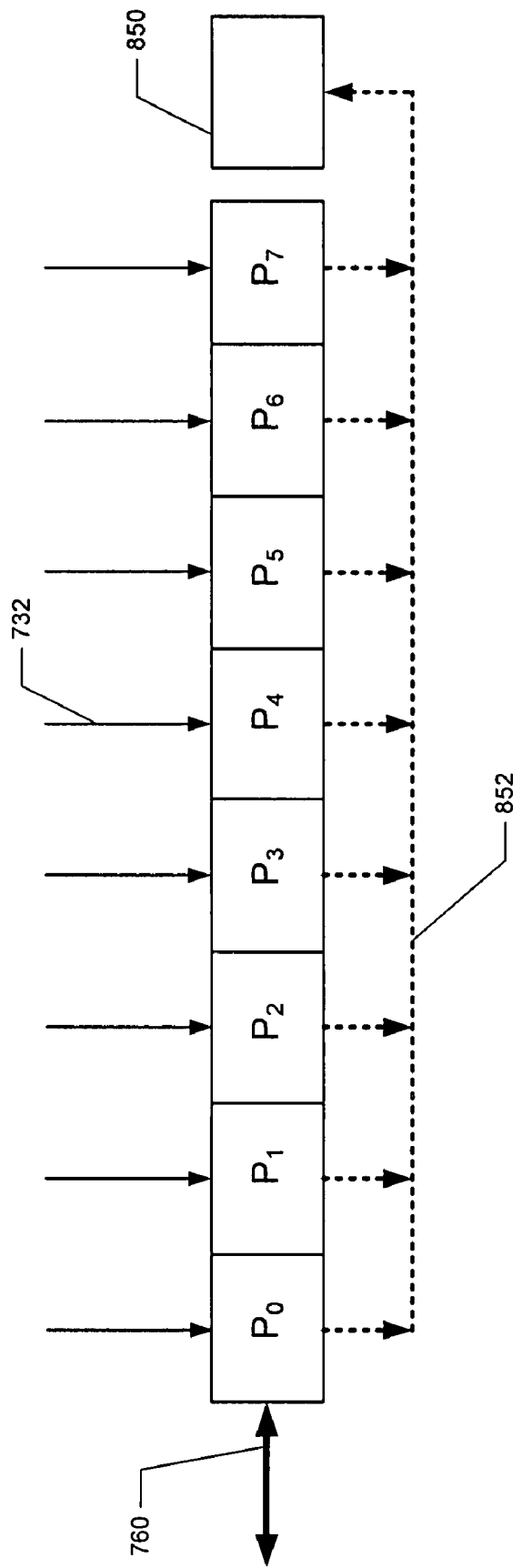
FIG. 8A is a diagram illustrating a simple NIC register comprising a single row of data.
Figure 8B:
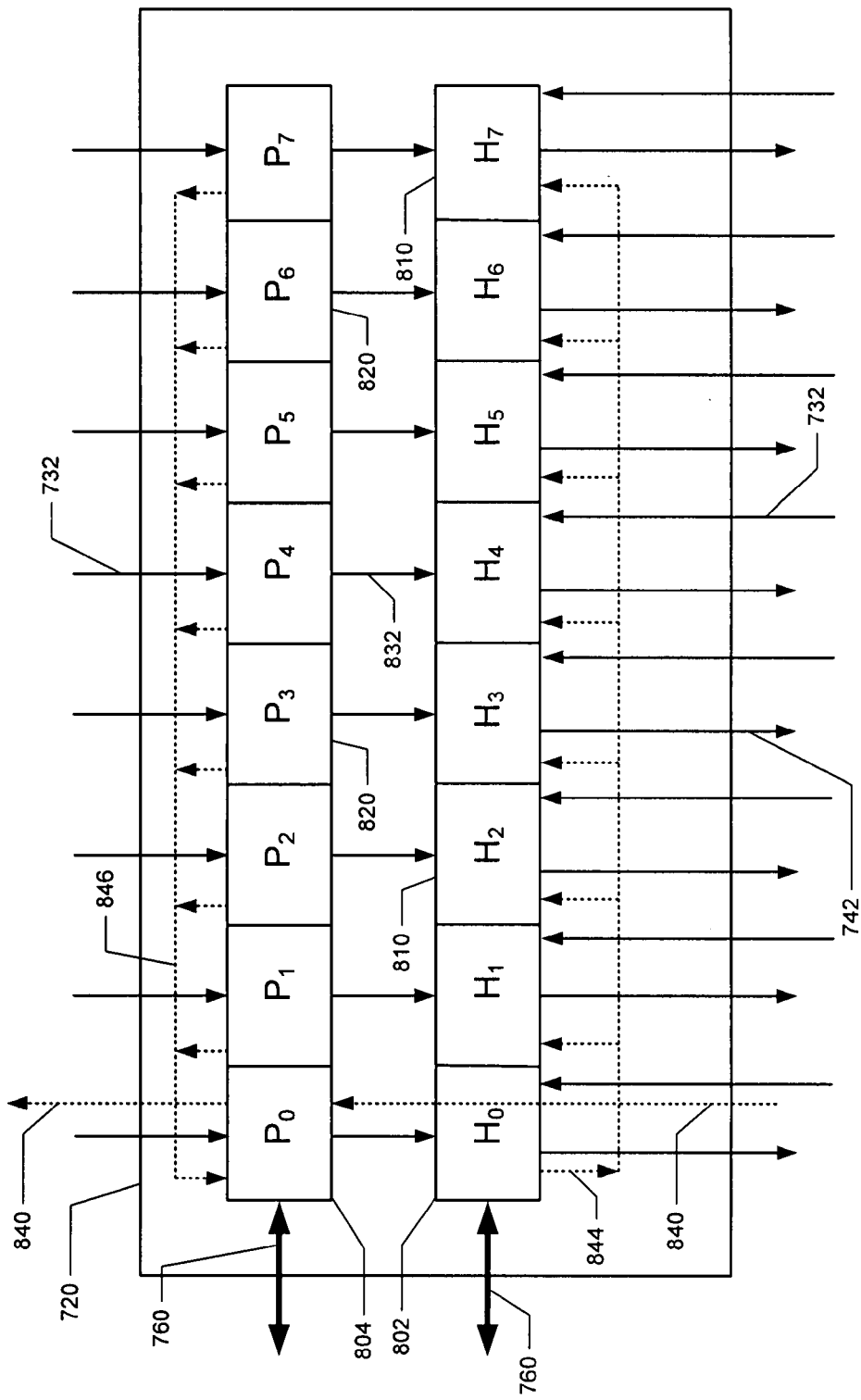
FIG. 8B is a block diagram showing a compound NIC Gather-Scatter register comprising two rows of data.
Figure 9:
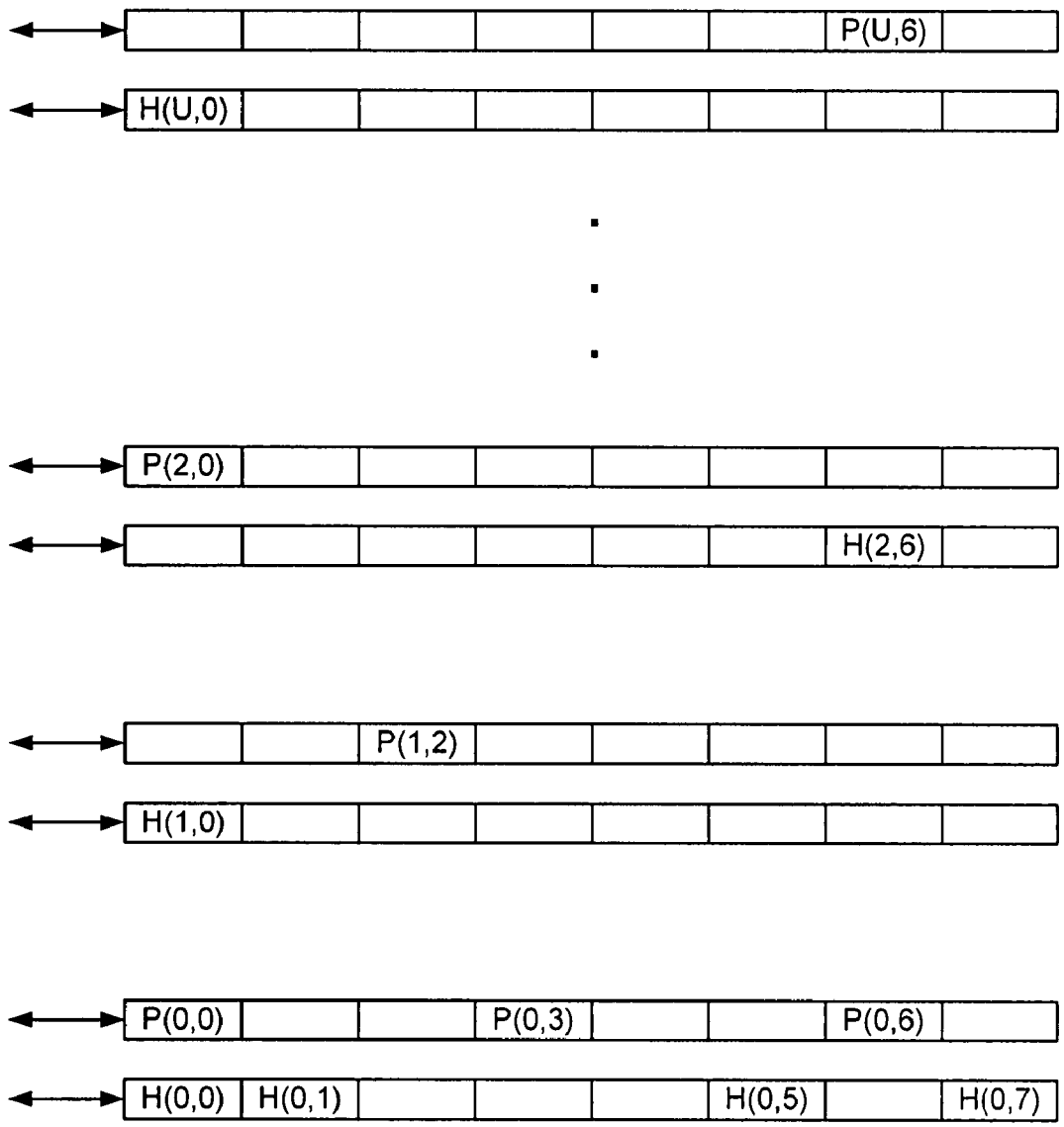
FIG. 9 is a diagram showing a collection comprising T Gather-Scatter register with each register containing eight cells.

Referring to FIG. 8A in conjunction with FIG. 8B, each of the NIC registers is divided into multiple cells. The number of cells is completely general. In the illustrative example, the number of cells is set to eight and the number of bits in a cell is set to 64. Other examples can have more or fewer cells. NIC registers are numbered so that the lowest simple NIC register is labeled SNR(0), the register directly above SNR(0) is labeled SNR(1) and so forth so that in case of a system with T+1 simple registers, the simple registers are labeled to create the sequence SNR(0), SNR(1), SNR(2), ..., SNR(T). The labeling of the cells in the simple register SR(D) is SR(D,0), SR(D,1), ..., SR(D,7). An integer t<T exists so that the first t simple node registers SNR(0), SNR(1), ..., SNR(t-1) are used to track the status of the remaining simple node registers SNR(t), SNR(t+1), SNR(t+2), ... SNR(T). In a system with U+1 compound registers, the compound registers are labeled CNR(0), CNR(1), ..., CNR(U). The compound register CNR includes two registers H (a header register) and P (a payload register). FIG. 9 illustrates enumeration of the cells in compound registers. A packet in the K cells of CNR(N), has a header in H(N,K) and a payload in P(N,K). A packet in the two cells in position K of a compound NIC register are simply labeled as $H_K$ and $P_K$.

Data is transferred into the cells of a NIC register 720 and into the cells of a NIC register 722 from an Opteron processor 750 through line 760 and from the NIC input switch 730 through lines 732. Data entering through line 760 and 732 may be fanned out using the techniques illustrated in FIG. 5 or by some other appropriate means. FIG. 7 shows a structure without fan out. Individual cells of the NIC registers are individually addressable. Therefore, a given register is able to simultaneously receive data from a number of distinct compute nodes. In the case where numerous cells are receiving data, the data is sent from different switch chips 770 in the central switch hub. Similarly, a given NIC register is capable of simultaneously sending data from a plurality of cells through lines 760 to the processor and through lines 742 to the NIC output switch. Data arriving at the NIC output switch can be sent though lines 734 to the NIC input switch so that the NIC is capable of rearranging the data to be delivered to the processor in the most useful form. Data arriving at the NIC output switch can also be sent via lines 752 to the central switch hub. Data that is sent from a single NIC register at a given time can be scattered across the system to numerous other NIC registers on one or more compute nodes 700.

The operation of the NIC in the illustrative example exploits several features of the Opteron Processor and the HyperTransport™ technology. The processor can write to a remote device. In the present example, the processor sends message packets to remote nodes by writing to a NIC register. The processor can issue one or more commands to a remote device that are referenced herein as "send when ready" command to a specific location in a remote device. The command, in conjunction with the hardware interface on the remote device, cause a 64-byte data transfer into the processor so long as a specified bit or bits in a cell used for control (cells $H_0$ or $P_0$) are set to indicate that the data to be transferred is in the specific location in the remote device. When the processor issues a command of the class "send when ready" and a predetermined set interval of time (TIMEOUT) has passed, the contents of the location on the remote device are transferred even in the case when not all of the data has arrived. The number TIMEOUT is set so that transfer of data into the processor as a result of the TIMEOUT condition is a rare event. If TIMEOUT does occur, data is transferred into the processor via a HyperTransport™ but the processor notes that the control cell bits indicate that the proper data is not in the packet. In case the processor receives an invalid packet, the processor responds in a manner designated by the operating system. The processor can also issue one or more commands of the class "send now" in which case the data is transferred immediately. The command should be used only when the processor has confirmed that the data is in place. The command may take more time to execute because a method for informing the processor that the data is ready may exist but the processor may not receive notification without added latency. The advantage of the command is that no field in the transferred data needs to be reserved for control information.

As depicted in several data transfer examples, the illustrative systems and techniques enable an efficient method of transferring data between devices by a requesting processor $P_{REQ}$ requesting that a data sending node $P_{SND}$ transfers data located on the $P_{SND}$ compute node to a location on the $P_{REQ}$ compute node. The request is made by processor $P_{REQ}$ sending a request packet to $P_{SND}$. The request packet comprises a header and a payload. The payload contains the address or addresses of the requested data on node $P_{SND}$ and also contains the location on node $P_{REQ}$ where the data is to be sent. The data is sent to one or more simple or compound NIC registers on node $P_{REQ}$. In other examples, processor $P_{SND}$ can request that the data be sent to registers on compute nodes other than the local compute node of $P_{SND}$. The description of the location of the data on the $P_{SND}$ node can be conveyed using a wide range of formats. A simple example of such a description of data is for a string of a predetermined length starting at a specified location in memory. The receiving location for the data is given as a list of cells in the simple or complex NIC registers. Several examples of transfers are as follows: Example 1) depicts a straightforward example wherein the request can be for a string of data of length (5·64) starting at a memory location X to be placed in simple register cells SNR(D,0). SNR(D,1), SNR(D,2), SNR(D,3) and SNR (D,4). The format of the description of the receiving location can be given in a wide range of formats. The data can be sent across the system in five packets with the first 64 bits of the string being sent to the simple node register cell SNR(D,0), the next 64 bits of the string being sent to cell SNR(D,1) and so forth. In the example, one data packet has the first 64 bits of the string as a payload and the header would contain the address of the compute node containing $P_{REQ}$, and the address of SNR(D,1) along with other information possibly including error correction bits. Example 2) illustrates a corner turn in the network. The request is made for the same string of data to be placed in compound register cells CNR(D,2), CNR(D+1, 2), CNR(D+2,2), CNR(D+3,2), CNR(D+4,2). The third packet in the transfer has the third group of 64 bits in the payload and has the cell P(D,2). A wide range of formats can be used in describing addresses for the transfers. Example 3) depicts transfer of data comprising specified parts from a sequence of structures with the data placed in the receiving NIC registers on a defined stride. A wide range of formats can be used in describing addresses for the transfers.

The system is described by examining several operations. The first operation to be examined is the request for data from the virtual memory space of a remote node.

A "Request for Data from Memory on a Remote Node I" operation is useful in a transaction involving a "send when ready" command. A data requesting processor $P_{REQ}$ requests up to seven cells of data from the virtual address space of remote data sending processor $P_{SND}$. The transaction illustrates the functionality of the various components in the system. In order to effect the data transfer, $P_{REQ}$ performs three functions: 1) The processor sends data to one or more of the control cells $H_0$ and $P_0$ of NIC registers that will receive the data; 2) The processor assigns a Transaction Identifier (TID) to the transfer and sends: a) the TID; b) the number of packets being transferred using the TID; and c) the address of the processor $P_{SND}$ to an EC-ACK unit 780 that performs error correction on incoming packets and handles ACKs and NAKs; 3) The processor sends a plurality of request packets in a set RPSET (including the request packet REQ to $P_{SND}$). Therefore, sending of RPSET can result in the gathering of data from multiple compute nodes into the NIC registers on a predetermined compute node. The RPSET requests data for a collection CNUM of adjacent compound NIC registers; 4) After an appropriate time (the minimum time for the data to return, the processor $P_{REQ}$ sends a "send when ready" command to all of the NIC registers that are scheduled to receive data as a result of the sending of the set RPSET of packets.

With respect to function 1) above, the processor $P_{REQ}$ indicates the number of packets to be transferred into a NIC register in response to the set of request packets RPSET by sending the number to the appropriate NUMPK field in the $P_0$ in each of the NIC registers that receives the data. In case the set of requests result in the arrival of data in J adjacent compound registers (registers NR(S), NR(S+1), NR(S+J−1), and the processor $P_{REQ}$ accesses the received data from lowest receiving register to highest receiving data in order, the integer J is also placed in a field ORDER of the cell $P_0$ of the lowest target register NR(S). Other target registers have the integer 0 in the second field. A third field SEND is set to zero. In case only one register is destined to receive data or the processors are to access the data without respect to order, the integer 1 can be placed in each of the fields. Use of the information in the control cell is discussed in Note 0 hereinafter. An efficient method for transferring the information to the control cells is discussed in Note 1 hereinafter. With respect to function 2) above, the EC-ACK management unit 780 determines how many packets are to be transferred with each TID in order to send the ACK or NAK associated with the appropriate TID. The operation of unit 780 is discussed hereinafter in Note 2. With respect to function 3) above, the handling of data between processing nodes is handled by sending request packets for data and the sending of data in response to the request packets. A processor moves data from a remote node into local memory in the processor by requesting the data to be transferred into processor NIC registers and then moving the data from the local NIC registers into processor local memory.

In function 3) the processor $P_{REQ}$ has a method (perhaps by use of a table) of ascertaining the location of the node containing the requested data. The first step of the transaction processes is for processor $P_{REQ}$ to send a request packet REQ to $P_{SND}$. The payload of REQ contains the following information: 1) the location from which the data will be transferred: 2) the address of the receiving compute node, the target NIC register as well as the location of the cell or cells in the NIC registers 720 or 722 that will receive that data; 3) the transaction Identifier (TID).

The processor $P_{REQ}$ can send out a number of packets simultaneously with the sending out the packet REQ. In one mode of operation, the processor uses a double NIC register 720 to send out one to seven packets at a given time. The processor $P_{REQ}$ forms a HyperTransport™ double load packet with a payload of 128 bytes. The processor sends the packet to a double register 720. As a result of the sending, the packet REQ and possibly other packets are transferred to a double register. The payload of the packet REQ is transferred to a position $P_K$ in the register and the header of the packet REQ at a position $H_K$ in the register (where $0 < K < 8$). The HyperTransport™ double load packet also places special code in $H_0$ and $P_0$ that modify a field in each of the cells $H_1$, $H_2, \ldots, H_7$ indicating that all of the packets in a NIC register are ready to be transferred from the register into the NIC output switch. The HyperTransport™ double load packet can place other codes in the $H_0$ and $P_0$ cells including the number of packets loaded into the register that assist in the transfer of the packet. The use of cells $H_0$ and $P_0$ are quite varied and are to be used as directed by the operating system of the computer. Alternatively, the individual H fields can be modified by another technique. One such technique is by having the individual headers entering $H_N$ to have the send bit set, most effectively the last bit to enter $H_N$. In response to the code in cell $H_0$, transfer logic (not illustrated) sends the packets through lines 742 to separate inputs of the NIC output chip. The functionality of the NIC output switch will be discussed below in Note 3. The packets travel through lines 752 to separate central hub switch chips 750. Thus one or more packets can be simultaneously transferred out of the register. The packets are then scattered throughout the system in accordance with the packet headers.

In an appropriate time after the processor has issued the set comprising one or more request packets, the processor can issue one or more "send when ready" commands to the locations that will receive the data as a result of the sending request packets.

The request packet (REQ) travels through one of the switch chips in the central switching system to the NIC associated with $P_{SND}$. The header of the packet REQ contains the address of the NIC that is on the compute node containing $P_{SND}$. The central switch hub delivers REQ to the NIC input switch on the compute node containing $P_{SND}$. The header of the packet REQ indicates that the packet is to be delivered to one of several "surprise" registers 722 that are designated to receive packets of a class that include request packets of the form REQ. The registers 722 are referred to as surprise registers because they deliver packets other than requested data to a processor. Hardware (not illustrated) places REQ in the surprise register SR. The data in SR is transferred to $P_{SND}$ in response to a "send now" or a "send when ready" command issued by $P_{SND}$ to the surprise register containing the packet REQ. In one embodiment, the packet REQ contains the virtual address of the requested data. The processor $P_{SND}$ acquires the requested data and forms one or more packets to load into a double register $REG_{SND}$ 720. The processor $P_{SND}$ uses ACK information in order to determine which of the registers is free. The use of the ACK information to ascertain which registers are free will be discussed later in the description Note 4. The response packets including the packet RES (an arbitrary packet that will be tracked below) are loaded into the register $REG_{SND}$ with the payloads in some or all of the positions $P_1, P_2, \ldots P_7$ and headers in the corresponding positions in $H_1, H_2, \ldots H_7$. The headers contain various information including: 1) the location of the compute node containing $P_{REQ}$; 2) the address of the NIC register on the compute node containing $P_{REQ}$; 3) the location of the target cell in the said NIC register; 4) the TID. The last bit of data that is placed in a pair of register cells $[H_K, P_K]$ is a code that is placed in a special OUTPUT field in the header $H_K$. When the last bit arrives, data is sent from the header and payload cell pair through line 742. The contents of cells $P_0$ and $H_0$ are not sent because the OUTPUT field of $H_0$ is not set for sending.

The packet RES passes through line 742, through switch 740, through line 752, through switch 770, through line 754 into the EC-ACK unit 780. The operations performed by the EC-ACK unit are discussed in Note 2 hereinafter. The packet is then delivered to the appropriate cell of the target NIC register assigned to receive the packet by processor $P_{REQ}$.

(Note 0): Referring to FIG. 8B, when the packet RES arrives at the target NIC register, the payload is placed in the cell $P_K$ that was prescribed by the processor $P_{REQ}$. The packet RES has a leading one indicating the presence of a packet. After the entire payload of RES is in processor $P_K$ (an appropriate amount of time following the arrival of the leading one in the packet), a signal is sent from cell $P_K$ to processor $P_0$ indicating the arrival of RES. A field NUMPAK in $P_0$ is prior-loaded with the total number of packets directed arrive at the target register as a result of the sending of a set of request packets. In response to the signal from $P_K$ to $P_0$, the number in the field is decremented by one. When all of the packets have arrived, the number indicating the number of packets not yet arrived is set to data 0. The presence of a data 0 in the field is a necessary but insufficient condition for the transfer of the data in the payload fields of the NIC register into the processor $P_{REQ}$. In case a positive integer is positioned in the field NUMPAK, no action is taken. In case a data 0 is positioned in the field NUMPAK, a data 0 is in the field ORDER, and a data 0 is in the field SEND, no action is taken. In case a data 0 is positioned in the field NUMPAK, and a positive integer is in the field ORDER, then a data 1 is placed in the field SEND indicating the packet is prepared to be sent to the processor. In response to the value of 1 in the SEND field, and the reception of the "send when ready" command of the processor, the hardware that loads the HyperTransport™ line causes the data in the payload cells in the NIC register to be sent to the processor $P_{REQ}$. After the payload data in a NIC register NR(C) is sent to the processor, logic in the register, decrements the integer in the field ORDER and sends the new value in that field through line 840 to the $P_0$ field ORDER in the NIC register NR(C+1). The logic in NR(C) then sets the NR(C) fields SEND, ORDER, and NUMPAK to data 0. By using the $P_0$ cell of the compound registers in the manner described herein, the requested can be efficiently sent to the processor $P_{REQ}$ in the proper order.

(Note 1): Referring again to FIG. 8B a logic is associated with the header portion of the compound register that uses information in $H_0$ to fill in the contents of the cells $H_1, H_2, \ldots H_7$. Therefore a processor P can send a packet to the cell $H_0$ to fill all of the fields in the lower half of the compound register. The use of such formulas uses labeling scheme for the cells. Referring to FIG. 9, one such scheme labels a cell with the 4-tuple [T, U, V, W] where [T,0,U,V] denotes cell A(U,V) on compute node T and [T,1,U,V] denotes cell B(U,V) on compute node T. In case T is the address of the compute node containing the processor $P_{REQ}$, the formula: 0<N <7 $H_N$=[T, 1,C+N,0] fills a seven-high column of $P_0$ values in NIC registers targeted to receive data into seven adjacent compound registers as a result of a set of request packets.

(Note 2): Referring to FIG. 7, a processor $P_{REQ}$ requesting data performs several functions. One of the functions is to send a packet with a payload containing the ordered triple of integers [I,J,K] where: I is the TID of the request; J is the number of packets to be transferred as a result of the request; and K is the location of the compute node containing the processor $P_{SND}$. The TID packet is transferred by processor $P_{REQ}$ to the EC-ACK unit via a special set of simple NIC registers. Data in the registers does not pass through the NIC output switch. A set number of TID numbers are allowable. The EC-ACK unit has a memory with the set of allowable TID numbers as addresses. When the TID packet with payload [I,J,K] arrives at the EC-ACK unit, the numbers J and K are stored in location I. Since the TID packet never goes off the computer node board, error correction is unnecessary when the TID packet arrives at the EC-ACK unit.

A data packet arriving from the central switch hub via a line 754 may pass through a SerDes module (not shown). The packet then enters the EC-ACK module where the packet undergoes error detection and correction. The error correction is performed in unit 780. In case the data cannot be error corrected, but the TID, sending node address, and proposed storage cell address can be ascertained, the EC-ACK unit can send a NAK via line 782 to a NIC register to be forwarded back to the sender. In case the EC-ACK unit cannot correct a packet and cannot reconstruct the information for sending a NAK, the packet is discarded and the operating system makes a re-request for the packet because of a timeout condition. When a packet arrives at the EC-ACK unit and no errors are detected or at least one error occurs and all errors can be corrected, then the TID of the packet is read and the integer J in storage location TID is decremented. If after being decremented, the integer in location TID is data 0, then all of the data packets associated with TID have arrived and an ACK can be returned to the node with address K. The transfer of the ACK to node K is accomplished by the EC-ACK module sending a one or more ACK packets to pairs of cells in a compound NIC register.

(Note 3): The NIC output switch has a number of functions including: 1) bypassing defective central hub switch chips as well as bypassing defective lines to or from a central hub switch chip; 2) segregating jobs running on the computer; and 3) lowering the average latency of packets passing through central switch hubs in systems that have multiple hops. Function three is discussed in the incorporated patents and patent applications relating to multiple hop data vortex systems. In single hop systems, the operating system receives data indicating defective lines and central switch difficulties in the system and based on the information, the NIC output switch can route around those defects. When a portion of the processing nodes are assigned to a given compute job, a number of central switch chips are dedicated to transfer data between those nodes. By the illustrative technique, strict system security can be maintained. Moreover, if one of the jobs starts the flow of a long sequence of packets to a single compute the node and the packet sequence causes a backup in the network, that backup cannot interfere with other jobs. The program causing such a backup violates rules which specify that requesting processors pulling data packets across the system are prohibited from over-requesting. The number of surprise packets in the system is similarly limited. The system is therefore designed to operate with extreme efficiency when used correctly and a user that uses the system incorrectly cannot adversely affect other jobs that are on the system.

(Note 4): Processor $P_{SND}$ responds to a request for data packet from processor $P_{REQ}$ by placing the requested data in one or more NIC registers. In case a packet is transferred out of a NIC registered but the packet does not reach the target register, another request is made for the data. Thus the data is left in the sending NIC register until an ACK for that data is received. When the ACK is received, the processor is able to restore the sending register to the processor's available list in preparation for another data transfer. The preceding section discusses the request for data from a remote memory location. The resending of data because no ACK is returned to the sending causes a request for data from a NIC register from a remote node, representing only one of the reasons for a capability of processors to request and obtain data that is stored in NIC registers on remote nodes. The method of obtaining data from a remote NIC register is discussed hereinafter in the disclosure. The "Request for Data from Memory on a Remote Node I" operation has the property that all other data transfers are slight simplifications or modifications to the process.

A "Request for Data from Memory on a Remote Node II" operation is a useful transaction involving a "send when requested" command. A data requesting processor $P_{REQ}$ requests up to eight cells of data from the virtual address space of remote data sending processor $P_{SND}$ by sending a request packet REQ to $P_{SND}$ instructing $P_{SND}$ to return the data to prescribed cells in a simple register SR(t+s). In response to reception of the packet REQ, the processor $P_{SND}$ loads the requested data into the payload cells of a compound NIC register and also loads headers into the header section of a compound NIC register so that the payload packets arrive in the simple register at the locations prescribed by the request packet REQ. In the sending of eight data packets from a compound register, the packet with header $H_0$ and payload $P_0$ is sent along with the other seven packets, for example by placing the proper bit in the OUTPUT field of the header $H_0$. Analogous to the requesting processor $P_{REQ}$ placing the number NUMPAK in the cell $P_0$, in the receiving complex NIC register the previous section, $P_{REQ}$ places the number NUMPAK in the auxiliary cell 850. As the packets arrive in the simple NIC register, signals are sent down lines 852 causing the number in auxiliary cell 850 to be decremented. When the number is decremented to 0, the processor places a single bit set to 1 in the appropriate cell of one in a prescribed location in a simple register SNR(r) where r<t. The appropriate place to put the one is the $s^{th}$ cell of a simple node register by counting from left to right in SNR(0), and continuing to count from left to right in SNR(1) and so forth. The location can be found by dividing s by 64 and obtaining an integer I and a remainder J form the division and identifying the location as being in SNR(I) in cell J. The processor periodically checks the contents of the registers SNR(0), SNR(1), . . . , SNR(t−1) to ascertain which simple node registers have obtained all of requested data.

A "Request for Data from a Compound Remote NIC Register" operation is extremely simple. The requesting processor sends a packet to modify the contents of $H_0$. The modification of $H_0$ causes the proper modification to the data in the other cells of the register as discussed in Note 1 hereinbefore, or the requesting processors can send packets through lines 732 to access the data in a single cell.

A request for data can be made from a Simple NIC Register. For a requesting processor to obtain data from a simple NIC register, the processor sends a surprise request packet to the sending processor requesting the sending processor to copy the requested data into a compound register.

Sending a packet to a processor on a remote node can be accomplished by the processor performing a modification of function 3) in requesting data from a remote node. Eight packets can be simultaneously sent to different nodes, allowing extremely rapid broadcasting of messages using a tree with eight edges from each node.

In some embodiments the NIC Registers can be used as off-chip storage. Data in a processor's cache can be swapped out. A processor can use local NIC registers as a convenient way to put data in cache lines that cannot be swapped out.

In an example method of operation, parallel operation of the computer can be performed by processors passing data in local registers back and forth so that the computer can be used as a large systolic array. In fact, a processor on node X can cause data to be moved from a NIC register on a remote node Y to a NIC register on a different remote node Z.

Many techniques can be implemented to effectively use a computer with Data Vortex® chips in the central hub and NIC architecture based on the present disclosure. While the illustrative systems and structures exploit specific connections to Opteron processors, similar techniques can be used with different processors having other interfaces to remote devices.

What is claimed is:

1. A network device comprising a network interface card (NIC), the network interface card comprising:
   a controller that manages data flow through a network interconnecting a plurality of processors, the processors of the processor plurality comprising a local memory divided into a private local memory and a public local memory, a local cache, and working registers; and
   a plurality of cache mirror registers coupled to the controller that mirror a portion of the local cache in the processors and receive data to be forwarded to the processor plurality, the cache mirror registers containing a cache line of data so that a portion of cache is mirrored on the controller, wherein the controller responds to a request to receive data from one or more of the processors by transferring the requested data directly to public local memory without interrupting the processor, and by transferring the requested data via at least one of the cache mirror registers for a transfer to processor local cache and to processor working registers;
   wherein the controller responds to a request to transfer data to the public memory of a processor, the public memory being managed by the processor via at least one cache mirror register,
   wherein the controller responds to the request to transfer data to the public memory of a processor by selecting at least one cache mirror register, selecting at least one location in the at least one cache mirror register for receiving the data, and transmitting the identity of the selected at least one cache mirror register to a memory manager of the requesting processor.

2. The network device according to claim 1 further comprising:
   a plurality of compute nodes in a parallel computer, the individual compute nodes comprising a processor and a plurality of Network Interface Card (NIC) registers, the NIC registers comprising a plurality of cells that mirror a portion of a local cache in the processor and contain a cache line of data so that a portion of cache is mirrored on the controller; and
   a processor $P_{REQ}$ configured to request that data from at least one remote node to be placed in cells in a designated plurality of NIC registers local to the processor $P_{REQ}$ and in response to the requests, the requested data is transferred into the designated NIC register cells.

3. The network device according to claim 1 further comprising:
   a network interface card (NIC);
   the at least one cache mirror register configured to hold a cache line of data so that a portion of the local cache is mirrored on the NIC.

4. The network device according to claim 1 further comprising:
   the at least one cache mirror register further comprises a lock that prohibits data from passing to the processor until the lock is released.

5. The network device according to claim 1 further comprising:
   the controller comprising a physical page table map wherein a processor requesting data sends a request for data at a designated virtual address to the controller and the controller uses the physical page table map to determine a physical location of a node containing the requested data; and the controller responsive to a single request from a processor to store multiple data items in a plurality of cache mirror registers by selectively storing a sequence of data items in a row or column of cells of a cache mirror register buffer.

6. A network device comprising a network interface card (NIC), the network interface card comprising:
   a controller that manages data flow through a network interconnecting a plurality of local processors, the local processors of the local processor plurality comprising a local memory divided into a private local memory and a public local memory, a local cache, and working registers; and
   a plurality of gather-scatter registers coupled to the controller that sequentially transfer data between multiple buffers and the local processor plurality in a single data stream,
   wherein the plurality of gather-scatter registers mirror a portion of the local cache in the processors,
   wherein the gather-scatter registers contain a cache line of data so that a portion of cache is mirrored on the controller,
   wherein the controller responds to a request to transfer data streams by directly transferring the data streams to public memory without interrupting the local processors, and by transferring the requested data streams via at least one gather-scatter register to the local processor's local cache and to the local processor's working registers,
   wherein the controller is configured to receive a plurality of request packets from respective processors of the plurality of local processors and send the plurality of request packets to selected remote processors, the remote processors causing data to be transferred to locations in gather-scatter registers predetermined by the local processors; and
   wherein the controller responds to the request to transfer a data stream to the public memory of a processor by selecting at least one cache mirror register, selecting at least one location in the at least one cache mirror register for receiving the data, and transmitting the identity of the selected at least one cache mirror register to a memory manager of the requesting processor.

7. The network device according to claim 6 further comprising:
   a network interface card (NIC) comprising the controller and the gather-scatter register plurality;
   a computing node communicatively coupled to the NIC;
   the controller responsive to a request to transfer data from a sending location to a group of receiving locations in a designated gather-scatter register whereby the data is made available to move from the gather-scatter register to memory local to the NIC and computing node storage including a processing core working register, a cache memory, and a processing core local memory;
   the controller responsive to a request to transfer data from a sending location to a group of receiving locations in a designated gather-scatter register by receiving a request packet at a location in a designated gather-scatter register, the request packet requesting delivery of a plurality of locations in the gather-scatter register, the controller assigning a label to the request, maintaining a copy of the request, and sends the request through a switch to a remote data sending network interface card (NIC) designated by the controller; and
   the controller responsive to a request to transfer data that is not available in a gather-scatter register by retrieving a plurality of data packets from memory, transferring each packet of the data packet plurality to different switches in a central hub, and delivering each packet to a designated gather-scatter register, each of the data packet plurality comprising requested data, target register address, a request label, a target location in the gather-scatter registers to place the data, and a unique data packet identifier.

8. The network device according to claim 6 further comprising:
at least one compute node comprising:
at least two processors;
compute node local memory coupled to the at least two processors; and
a network interface card (NIC) integrated circuit (IC) chip coupled to the at least two processors and comprising a plurality of simple registers and a plurality of gather-scatter registers that sequentially forward transfer data between multiple buffers and the at least two processors in a single data stream; and
a plurality of hub switch IC chips communicatively coupled to the at least one compute node for bidirectionally transferring data among the compute nodes.

9. The network device according to claim 8 further comprising:
the at least one compute node further comprising:
a controller responsive to a request to transfer requested data streams directly to public memory without interrupting a processor of the at least two processors that transfers requested data via a designated gather-scatter register for a transfer to processor local cache and to processor working registers.

10. The network device according to claim 8 further comprising:
the network interface card (NIC) integrated circuit (IC) chip configured to transfer all data between compute nodes via the gather-scatter register plurality, the NIC chip further comprising:
an output switch coupled to the simple register plurality and the gather-scatter register plurality, the output switch configured to bypass defective hub switch IC chips, bypass defective lines to hub switch IC chips, segregate jobs running on the network device, and lower average latency of packets passing through the hub switch IC chips in systems that have multiple hops;
an input switch coupled to the simple register plurality and the gather-scatter register plurality;
an error correction-acknowledge unit coupled to the input switch that performs error correction and sends acknowledge (ACK) and not-acknowledge (NAK) signals.

11. The network device according to claim 8 further comprising:
registers of the simple register plurality and the gather-scatter register plurality comprise a plurality of individually addressable cells whereby the registers are configured to simultaneously receive data from multiple distinct compute nodes and to simultaneously sending data from a plurality of cells to the at least one processor and to an output switch in the network interface card (NIC) integrated circuit (IC) chip.

12. The network device according to claim 8 further comprising:
a processor of the at least two processors responsive to a request for data from memory on a remote node comprising:
sending data to at least one control cell of a network interface card (NIC) register designated to receive the data;
assigning a transaction identifier (TID) to the transfer;
sending the TID, number of packets transferred using the TID, and data source identifier to an error correction-acknowledge (EC-ACK) unit designated to receive the transfer;
sending a plurality of request packets to the data source;
waiting a minimum time for data to transfer; and
sending a "send when ready" command to all NIC registers scheduled to receive data;
a processor of the at least two processors responsive to a request for a plurality of data cells from virtual address space of a remote node comprising:
receiving a request packet at a sending processor wherein the request packet requests return of data to designated cells in an identified simple register;
loading requested data into payload cells of a compound network interface card (NIC) register; and
loading headers into a header section of a compound NIC register wherein payload packets arrive in the simple register at locations specified by the request packet;
a processor of the at least two processors operative to a request data from a compound network interface card (NIC) register comprising:
sending a packet that modifies contents of a header wherein logic associated with a header portion of the compound NIC register uses information in the header to fill contents of data cells in the compound NIC register; and
a processor of the at least two processors comprising a cache local to the processor and operative to use network interface card (NIC) registers as off-chip storage for storing cache lines that are not swapped out.

* * * * *